(12) United States Patent
Martin, II et al.

(10) Patent No.: US 7,423,931 B2
(45) Date of Patent: Sep. 9, 2008

(54) ACOUSTIC SYSTEM FOR COMMUNICATION IN PIPELINES

(75) Inventors: Louis Peter Martin, II, San Ramon, CA (US); John F. Cooper, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 159 days.

(21) Appl. No.: 10/855,243

(22) Filed: May 26, 2004

(65) Prior Publication Data

US 2005/0007877 A1 Jan. 13, 2005

Related U.S. Application Data

(60) Provisional application No. 60/485,466, filed on Jul. 8, 2003.

(51) Int. Cl.
*E21B 47/18* (2006.01)
(52) U.S. Cl. .................. 367/83; 340/870.01
(58) Field of Classification Search ........... 367/82, 367/83; 73/861.28, 40.5 A; 340/870.01
See application file for complete search history.

(56) References Cited

U.S. PATENT DOCUMENTS

| 4,337,667 | A | * | 7/1982 | Takada | 73/861.28 |
|---|---|---|---|---|---|
| 5,371,686 | A | * | 12/1994 | Nabity et al. | 73/861.25 |
| 5,416,724 | A | | 5/1995 | Savic | |
| 5,592,438 | A | * | 1/1997 | Rorden et al. | 367/83 |
| 5,623,421 | A | | 4/1997 | Savic | |
| 5,708,195 | A | | 1/1998 | Kurisu et al. | |
| 5,719,556 | A | * | 2/1998 | Albin et al. | 73/290 R |
| 5,757,664 | A | | 5/1998 | Rogers et al. | |
| 5,818,735 | A | * | 10/1998 | Tigwell et al. | 73/861.28 |
| 6,082,193 | A | | 7/2000 | Paulson | |
| 6,389,881 | B1 | | 5/2002 | Yang et al. | |
| 2002/0189362 | A1 | | 12/2002 | Havlena | |
| 2003/0138053 | A1 | * | 7/2003 | Candy et al. | 375/259 |

FOREIGN PATENT DOCUMENTS

WO    WO 02/103303 A1    12/2002

* cited by examiner

*Primary Examiner*—Ian J Lobo
(74) *Attorney, Agent, or Firm*—Eddie E. Scott; John H. Lee

(57) ABSTRACT

A system for communication in a pipe, or pipeline, or network of pipes containing a fluid. The system includes an encoding and transmitting sub-system connected to the pipe, or pipeline, or network of pipes that transmits a signal in the frequency range of 3-100 kHz into the pipe, or pipeline, or network of pipes containing a fluid, and a receiver and processor sub-system connected to the pipe, or pipeline, or network of pipes containing a fluid that receives said signal and uses said signal for a desired application.

17 Claims, 3 Drawing Sheets

ACOUSTIC SYSTEM FOR COMMUNICATION IN PIPELINES

CROSS-REFERENCE TO RELATED APPLICATIONS

This application claims the benefit of U.S. Provisional Patent Application No. 60/485,466 filed Jul. 8, 2003 and titled "Acoustic System for Communication in Pipelines." U.S. Provisional Patent Application No. 60/485,466 filed Jul. 8, 2003 and titled "Acoustic System for Communication in Pipelines" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to communication systems, and more particularly to a system for acoustic communication in a fluid-filled pipe or a network of fluid-filled pipes.

2. State of Technology

In U.S. Pat. No. 6,082,193 issued Jul. 4, 2000, Paulson uses an array of acoustic (passively listening) sensors along a cable deployed in a fluid-filled pipe to monitor the pipe status. The patent states "a cable is deployed in the pipeline, with at least one acoustic sensor attached. The acoustic sensor is selected to detect acoustic emissions in the fluid in which it is put. The acoustic emissions are those generated by an acoustic event in a pipeline such as emissions produced by a wire break or a high pressure leak. In a preferred embodiment, the sensor is a hydrophone." The use of these 'cabled' sensors is not practical in many pipe and pipeline systems due to the plurality of pipes.

Acoustic sensors have been proposed for water supply system monitoring. Savic, U.S. Pat. No. 5,416,724, uses passive (listening) acoustic transducers to monitor the sound generated within a pipe or pipe network filled with flowing fluid and distinguishes between acoustic signals originating from leaks and signals from ambient acoustic noise. His related patent U.S. Pat. No. 5,623,421 selectively identifies specific spectral lines from generally expected spectra. Sound generated by a leak is introduced into a digital processing and pattern recognition device to detect the presence of leaks.

United States Patent Application No. 2002/0189362 by Vladimir Havlena for communication for water distribution networks, published Dec. 19, 2002, provides the following state of technology information, "Control of processes is a broad general concern for every industry, particularly where fluids such as water are distributed in a network of pipes, vessels, containers and tanks.... One particular industry that requires significant control and which presently does not have adequate abilities for this goal is the water distribution networks that bring potable water from water supply sources and water treatment plants providing these water supply sources." The patent describes a system whereby a remote sensor makes a measurement (in their case pressure or flow rate) on the fluid contained in a pipe, which may or may not be part of a network of pipes, and then transmits acoustically the reading to a centralized control station. They refer to the frequency band 3-11 kHz, with the upper limitation due to the nature of sound dispersion and attenuation while propagating in a finite sized medium (i.e., in a pipe). This frequency limitation poses severe limitations on their potential data transmission rates. They make no mention of using any signal processing, matched filter, or other signal extraction techniques.

In U.S. Pat. No. 6,389,881, Yang, et al., describe the use of sophisticated signal processing techniques, such as pattern match filtering, to identify failure in fluid filled pipes. In their application, they use the signal processing to deconvolve the signal of interest, i.e., the sounds related to pipe failure, from the ambient 'noise' resulting from the fluid flow in the pipe. The technique uses an array of passive, 'listening' acoustic transducers to monitor the fluid for sounds relating to pipe failure. The frequency range associated with these events is very low, approximately 0.01 Hz to 10 Hz.

Accordingly, it would be of great advantage in the field if a system enabling high data transfer acoustic communication in fluid filled pipes could be implemented. Various applications of such a system could include wireless monitoring/control of remote operated submersible vehicles used for pipe inspection in hostile environments (e.g., power plant coolant drain pipes) and wireless communication in pipes or pipelines (e.g., from remote sensors monitoring the pipe itself or the fluid contained therein).

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for communication in a pipe, or pipeline, or network of pipes containing a fluid. The system includes an encoding and transmitting subsystem connected to the pipe or pipeline, or network of pipes that transmits a signal in the frequency range of 3-100 kHz into the pipe, or pipeline, or network of pipes containing a fluid, and a receiver and processor sub-system connected to the pipe, or pipeline, or network of pipes containing a fluid that receives said signal and uses said signal for a desired application.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

The present invention provides a system for communication in a fluid-filled pipe, or pipeline, or network of pipes. One embodiment of the invention comprises the steps of encoding information into a form suitable for transmission using as a carrier an acoustic signal in the frequency range of 3-100 kHz, generating the acoustic signal with the encoded information, introducing the acoustic signal into the fluid contained within the pipe or pipeline or network of pipes, transmitting the acoustic signal through the pipe or pipeline or network of pipes, receiving the acoustic signal, converting the acoustic signal to an electric signal, digitizing the electric signal, and deconvolving the information from the received, digitized signal by applying suitable signal processing including, but not limited to, Green's function analysis, matched filter techniques, and/or time reversal techniques. The invention may use a known pilot signal to enable deconvolution of the position-dependant transfer function of the pipe or pipe or pipeline or pipe network.

In one embodiment, a digital electronic or computer-based apparatus is used to encode information onto an electric signal suitable for conversion to an acoustic signal by an acoustic transmitter with a frequency in the range of 3-100 kHz. In one very simple embodiment, given here as an example, this is accomplished by creating a binary code with an on/off cycle much longer than the time required for one cycle of the acoustic signal. Other encoding techniques are also feasible. A suitable acoustic transmitter is immersed in the fluid contained in a pipe which may or may not be part of a pipe network. The transmitter converts the electric signal, which contains the encoded information, to an acoustic signal in the fluid contained in the pipe. The transmitted acoustic signal can be in the range of 3-100 kHz. The exact frequency is system dependant and is selected based on the properties of the fluid, the distance from the receiver, the amount of information to be transmitted, the required transmission rate, and the properties of the pipe or pipe network. The acoustic signal propagates through the fluid in the pipe(s), where it is distorted due to multi-path reflections from the walls, corners, T's, junctions, size/material changes in the pipe(s), etc. A receiver is immersed in the fluid in the pipe or a pipe connected the original pipe through a network of pipes. The receiver receives the acoustic signal and converts it to an analog electric signal. The analog electric signal is digitized electronically, and passed to a digital electronic or computer-based apparatus used for signal processing. The signal processing apparatus applies suitable signal processing including, but not limited to, Green's function analysis, matched filter techniques, and/or time reversal techniques to deconvolve the original information from the distorted, received signal.

Figure 1:
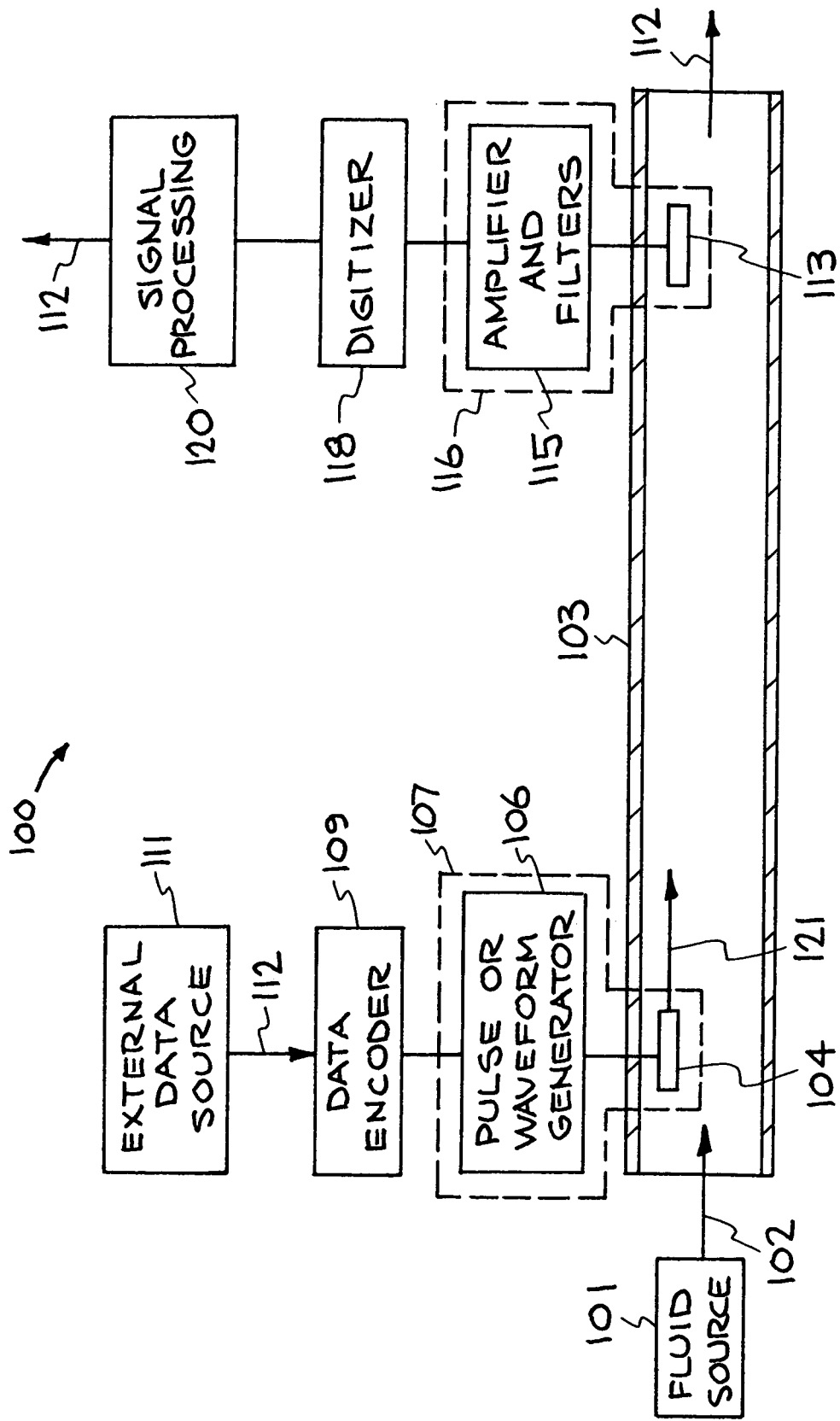
FIG. 1 illustrates an embodiment of a system constructed in accordance with the present invention.

Referring now to FIG. 1, this embodiment of the communication system constructed in accordance with the present invention is illustrated. The system is designated generally by the reference numeral 100. A flowing fluid 102 passes from a fluid source 101 through the pipes 103 of a pipe network or pipeline system. An external source 111 supplies a data signal to be transmitted. A data encoder 109 encodes the data for transmission by the acoustic transmitter 107. The transmitter 107 is comprised of an acoustic transducer in the 3-100 kHz range 104 and associated electronics for pulse or waveform generation 106. This frequency range allows the use of well-developed technology for the acoustic hardware. The sound-waves in this frequency range can propagate long distances in water 102 and are above most of the noise sources in the pipeline 104. The hardware for these frequencies is relatively inexpensive, and allows for a good compromise between power and size. The transducer 104 is located in the pipeline and exposed to the flowing fluid 102. The transducer 104 sends and acoustic signal 121 which propagates through the water 102 in the pipe 103. The acoustic signal 121 is received by receiver 116, which is composed of a receiving transducer 113, and associated amplifiers and filters 115. The signal received by receiver 116 is digitized electronically 118, and then processed at 120 for extraction of the initial data 112. At the end of the process, the original data 112 are recovered and transmitted on for the intended application.

Noise/interference sources in the pipeline 103 are addressed at the receiver 116 in order to minimize transmitter cost and complexity. The pipeline 103 constitutes a potentially noisy environment, and significant signal distortion can be introduced by sources including (but not limited to): external noise, multi-path echoes, inter-modal interference, and pipe geometry including bends, "T's", junctions, size/material changes, and joints. It is possible to address some or all of these issues by increasing the capability of the transmitter 107, however when an array of transmitters is desired, as in FIG. 2 below, the large number of transmitter units makes this undesirable. Applicants utilize relatively simple transmitters and develop signal processing techniques to deconvolve the coded information at the receiver 105 (i.e., "dumb" transmitters and smart receivers).

In one embodiment, the system constitutes a signal encoder, an acoustic transmitter in the frequency range of 3-100 kHz, a narrow-band acoustic receiver tuned to the transmitter, a means to digitize the received acoustic signal, and a computer-based apparatus for applying advanced signal processing techniques to deconvolve the received data from the distortion induced by the effects of the pipe boundaries, junctions, corners, etc.

In another embodiment, the system constitutes a signal encoder, acoustic transmitter in the frequency range of 3-100 kHz, a broad-band acoustic receiver, a means to digitize the received acoustic signal, and a computer-based apparatus for applying advanced signal processing techniques to deconvolve the received data from the distortion induced by the effects of the pipe boundaries, junctions, corners, etc. In one embodiment, the broad-band receiver is a hydrophone.

In another embodiment, the system constitutes an array of identical acoustic transmitters in the frequency range of 3-100 kHz, a narrow-band acoustic receiver tuned to the transmitters, a means to digitize the received acoustic signal, and a computer-based apparatus for applying advanced signal processing techniques to deconvolve the received data from the position-dependant transfer function of the pipe or pipe network The receiver distinguishes the source transmitters from one another by an identification code transmitted as part of the data.

Figure 2:
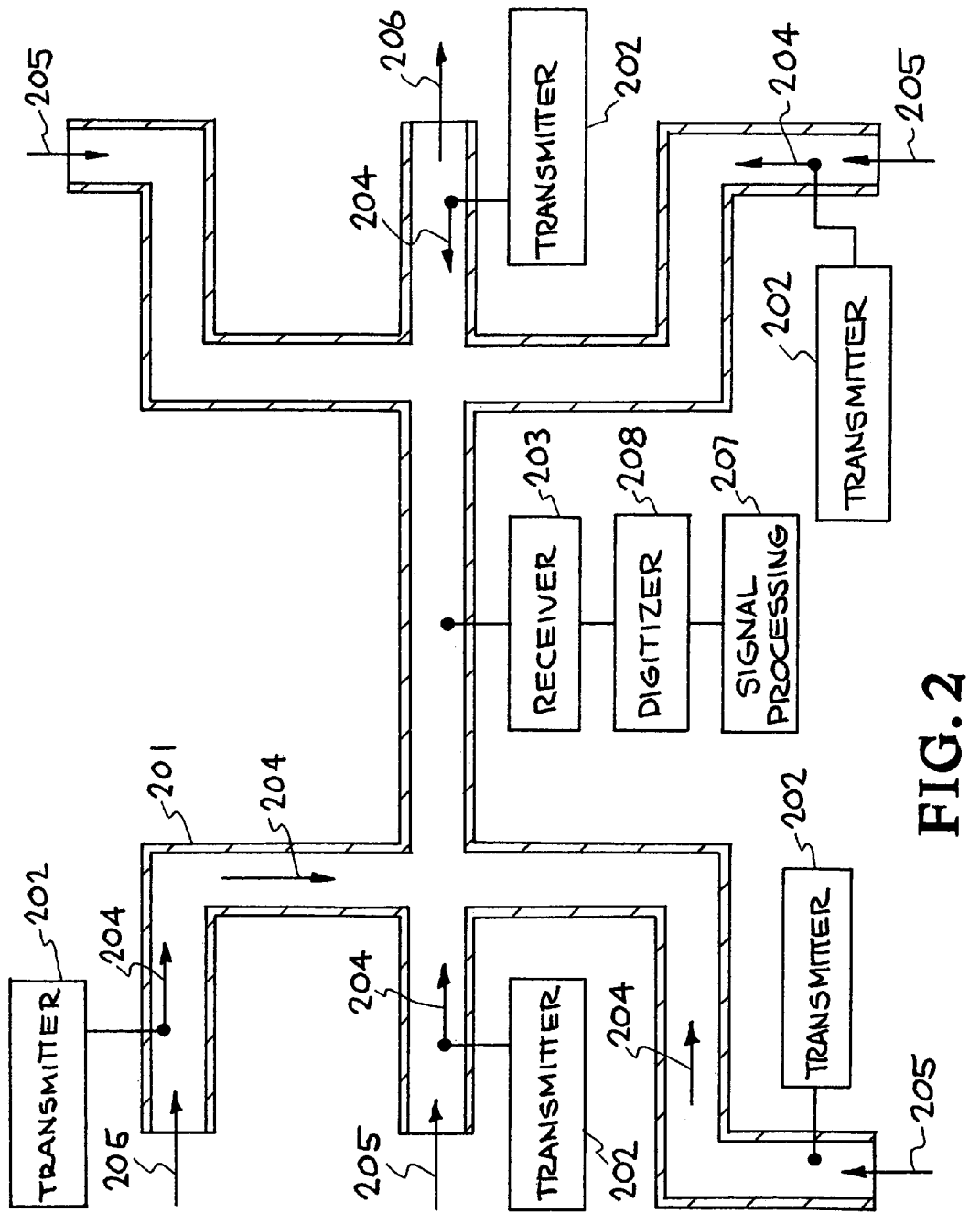
FIG. 2 illustrates another embodiment of a communication system.

Referring now to FIG. 2, this embodiment is schematically shown whereby a pipe network 201 has several sources of fluid 205 and one drain 206, although the configuration and number of the sources and drains are not important. The figure shows an array of identical transmitters 202 transmitting acoustic signals in the 3-100 kHz range 204 through the pipe network 201 to a single centralized receiver 203. The receiver 203 passes converts the received acoustic signals to electrical signals, and passes them to a digitizer 208 and then to a signal processing unit 207. The receiver 203 is a narrow-band receiver tuned to the frequency of the transmitters.

In another embodiment, the system constitutes an array of identical acoustic transmitters in the frequency range of 3-100 kHz, a narrow-band acoustic receiver tuned to the transmitters, a means to digitize the received acoustic signal, and a computer-based apparatus for applying advanced signal processing techniques to deconvolve the received data from the distortion induced by the effects of the pipe boundaries, junctions, corners, etc. (the position-dependant transfer function of the pipe). The position-dependant transfer function will be a unique function for each transmitter dependent upon the transmitter location. The receiver distinguishes the source transmitters from one another by the deconvolving the transfer function from the portion of the received signal corresponding to a known pilot signal transmitted as part of the data.

Figure 3:
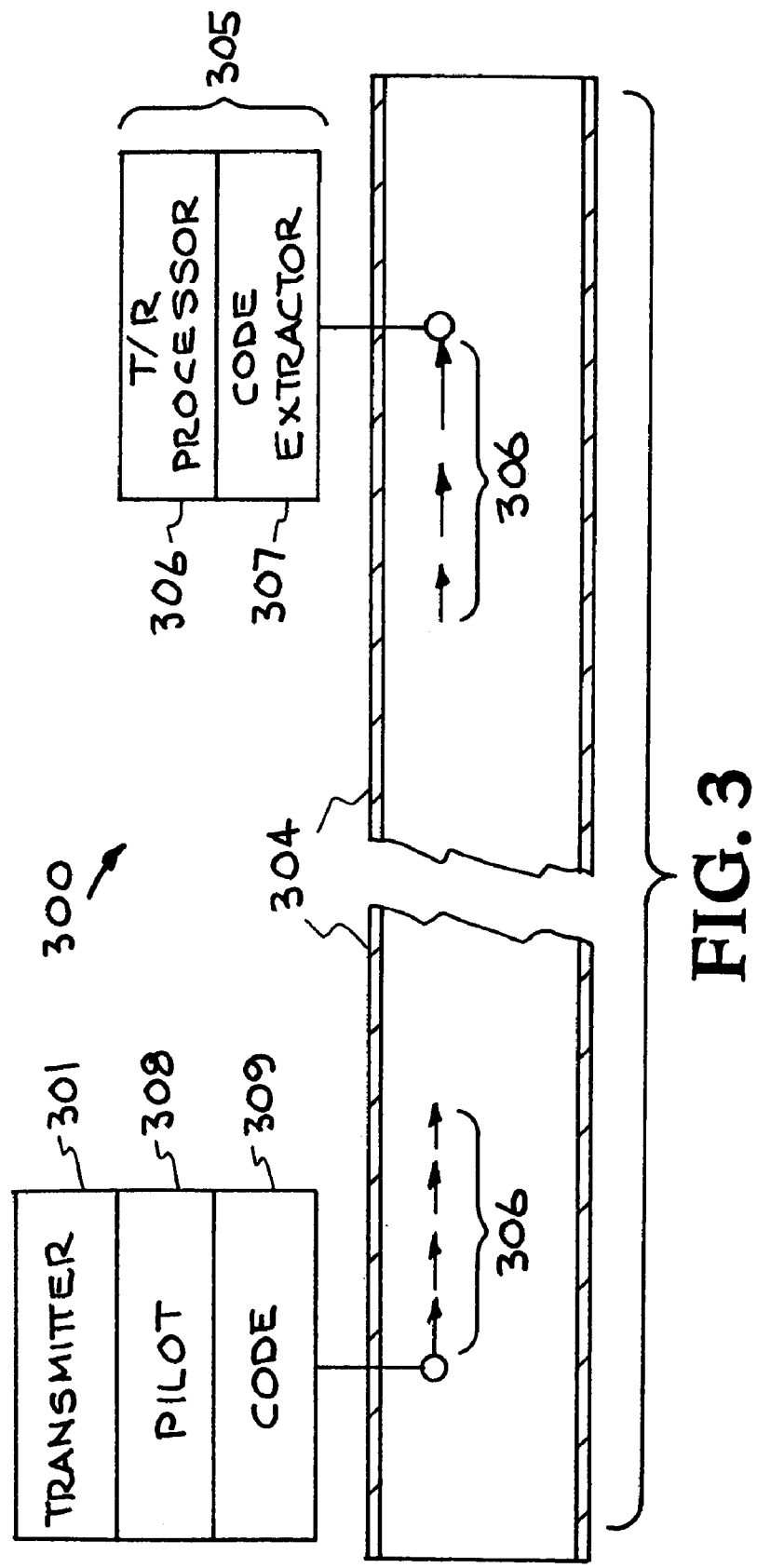
FIG. 3 show additional details of the communication system.

Referring now to FIG. 3, one transmitter—receiver pair is shown schematically for this embodiment. The embodiment is designated generally by the reference numeral 300. A transmitter 301 located in the pipeline 304 communicates with the receiver 305 by emitting acoustic signal bursts 306 using the pipeline 304 as a wave-guide or channel. The acoustic information signal 306 is transmitted by transmitter 301 through the pipeline 304 to the receiver 305, where it is available for a time reversal processor 306 and code extractor 307. The transmitter 301 includes pilot generator 308 and code generator 309. The receiver 306 utilizes sophisticated signal processing algorithms including model (physics)-based, time reversal, or other techniques to deconvolve the encoded signal from the distortion caused by the pipeline. The implementation of these techniques to the acoustic communication system 300 essentially consists of sending a known pilot signal 308 from the transmitter 301 to the receiver 305 prior to the transmission of the data. The signal processing algorithms are used to deconvolve the known pilot signal 308 and the unknown "transfer function" of the propagation medium (the pipeline between the transmitter and receiver). Once the effect of the pipeline on the known pilot signal is quantified, the appropriate signal processing can be applied to the distorted data signal to recover the data which might not otherwise be intelligible. Additional details of a communication system that can be used for the communication system 300 are shown in United States Patent Application 2003/0138053 by James V. Candy, James and Alan W. Meyer, published Jul. 24, 2003 and titled, "Time Reversal Communication System." The disclosure of United States Patent Application 2003/0138053 by James V. Candy, James and Alan W. Meyer, published Jul. 24, 2003 and titled, "Time Reversal Communication System" is incorporated herein by the reference.

In another embodiment, the system constitutes an array of different frequency acoustic transmitters in the frequency range of 3-100 kHz, a broad-band acoustic receiver, a means to digitize the received acoustic signal, and a computer-based apparatus for applying advanced signal processing techniques to deconvolve the received data from the position-dependant transfer function of the pipe or pipe network The receiver distinguishes the source transmitters from one another by the frequency content of the transmitted data, or by an identification code transmitted as part of the data, or by the deconvolving the transfer function of a known pilot signal transmitted as part of the data in the acoustic signal.

In another embodiment, the system constitutes an array of acoustic transmitters with different frequencies in the range of 3-100 kHz, a broad-band acoustic receiver, various frequency filters tuned to the different frequency transmitters, a means to digitize the received acoustic signal, and a computer-based apparatus for applying advanced signal processing techniques to deconvolve the received data from the position-dependant transfer function of the pipe or pipe network. The receiver distinguishes the source transmitters from one another by the frequency content of the transmitted data, or by an identification code transmitted as part of the data, or by the deconvolving the transfer function of a known pilot signal transmitted as part of the data in the acoustic signal.

In various other embodiments the computer-based apparatus used for signal processing utilizes Green's function analysis, and/or matched filter techniques, and/or time reversal techniques, and/or other unspecified digital signal processing techniques to deconvolve the received data from the position-dependant transfer function of the pipe or pipe network.

One embodiment of the present invention provides a system for acoustic communication in a fluid filled pipe, or network of pipes, or in a fluid bounded on 2 or more sides (for example, shallow water) with a dimension on the order of or larger than the acoustic wavelength. The communication could be used to relay data from remote sensors regarding analysis of the fluid, of the pipe or pipes, or for other purposes. Numerous embodiments of the invention can be proposed to accommodate various different applications and environments.

One embodiment of the present invention comprises the steps of encoding information into an acoustic signal in the frequency range of 3-100 kHz, introducing the acoustic signal into the fluid contained within the pipe or pipeline or network of pipes, transmitting the signal through the pipe or pipeline or network of pipes, receiving the signal, converting the acoustic signal to an analog electric signal, digitizing the electric signal, and deconvolving the information from the received, digitized signal by applying suitable signal processing including, but not limited to, Green's function analysis, matched filter techniques, and/or time reversal techniques. The invention may use a known pilot signal to enable deconvolution of the position-dependant transfer function of the pipe or pipe or pipeline or pipe network.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A communication apparatus that provides a system for providing high data transfer acoustic communication of information in a network of pipes that form a pipeline containing a fluid by transmitting the information through the fluid from a first location in the network of pipes that form a pipeline to a remote second location in the network of pipes that form a pipeline, comprising:

an external source that supplies a data signal containing the information to be transmitted through the fluid from the first location in the network of pipes that form a pipeline to the remote second location in the network of pipes that form a pipeline, a transmitting system positioned at the first location in the network of pipes that form a pipeline and connected to said external source and the fluid in the network of pipes that form a pipeline, said transmitting system including an acoustic transmitter with a frequency in the range of 3-100 kHz positioned at the first location in the network of pipes that form a pipeline and connected to said external source and the fluid in the network of pipes that form a pipeline that receives said data signal containing the information and transmits said data signal containing the information in the form of a signal in the frequency range of 3-100 kHz into the fluid in the network of pipes that form a pipeline containing the fluid to initiate transmission of the information from the first location in the network of pipes that form a pipeline, wherein said data signal propagates through the fluid in the network of pipes that form a pipeline from the first location in the network of pipes that form a pipeline to the remote second location in the network of pipes that form a pipeline, and an independent receiver and processor system located at the remote second location in the network of pipes that form a pipeline and connected to the fluid in the network of pipes that form a pipeline containing the fluid that receives said data signal and process said data signal containing the information, wherein the information is transmitted through the fluid from the first location in the network of pipes that form a pipeline to the remote second location in the network of pipes that form a pipeline and is used for a desired application.

2. The apparatus of claim 1 wherein said encoding and transmitting system includes a digital electronic or computer-based apparatus used to encode information onto an electric signal suitable for conversion to an acoustic signal by an acoustic transmitter frequency range of 3-100 kHz.

3. The apparatus of claim 1 wherein said encoding and transmitting system includes an acoustic transmitter in the frequency range of 3-100 kHz immersed in the fluid.

4. The apparatus of claim 1 wherein said encoding and transmitting system includes an acoustic transmitter in the frequency range of 3-100 kHz immersed in a portion of the fluid and wherein the portion of fluid is part of the pipe or pipeline, or network of pipes.

5. The apparatus of claim 1 wherein said encoding and transmitting system includes an acoustic transmitter in the frequency range of 3-100 kHz immersed in a portion of the fluid and wherein the portion of fluid is not part of the pipe or pipeline, or network of pipes.

6. The apparatus of claim 1 wherein said receiver and processor system includes an apparatus for electronically digitizing said signal.

7. The apparatus of claim 1 wherein said receiver and processor system includes a digital electronic or computer-based apparatus used for signal processing.

8. The apparatus of claim 1 wherein said receiver and processor system includes a digital electronic or computer-based apparatus used for signal processing using Green's function analysis.

9. The apparatus of claim 1 wherein said receiver and processor system includes a digital electronic or computer-based apparatus used for signal processing using matched filter techniques.

10. The apparatus of claim 1 wherein said receiver and processor system includes a digital electronic or computer-based apparatus used for signal processing that includes a time reversal signal processor.

11. The apparatus of claim 1 wherein said receiver and processor system includes a broad-band receiver in the frequency range of 3-100 kHz.

12. The apparatus of claim 1 wherein said receiver and processor system includes a narrow-band receiver in the frequency range of 3-100 kHz.

13. A communication apparatus that provides a system for providing communication in a network of pipes that form a pipeline containing a fluid by transmitting information through the fluid from a first location in the network of pipes that form a pipeline to a remote second location in the network of pipes that form a pipeline comprising:

an array of digital electronic or computer-based apparatus positioned at the first location in the network of pipes that form a pipeline and connected to the network of pipes that form a pipeline containing the fluid, used to encode information onto an electric signal suitable for conversion to an acoustic signal by an acoustic transmitter frequency range of 3-100 kHz to initiate transmission of the information from the first location in the network of pipes that form a pipeline, an array of acoustic transmitters in the frequency range of 3-100 kHz immersed in the fluid and located at the first location in the network of pipes that form a pipeline, each transmitter interfaced with one of said digital electronic or computer-based apparatus, wherein said acoustic signal propagates through the fluid in the network of pipes that form a pipeline from the first location in the network of pipes that form a pipeline to the remote second location in the network of pipes that form a pipeline, means for transmitting a known pilot signal from each of said transmitters, an independent narrow band receiver tuned the frequency of said transmitters and immersed in said fluid located at the remote second location in the network of pipes that form a pipeline, an apparatus for electronically digitizing said acoustic signal, a digital electronic or computer-based apparatus used for signal processing, and means for evaluating and comparing said encoded information determined from said pilot signal to identify the source transmitter for a received signal containing said pilot signal and encoded information, wherein the information is transmitted through the fluid from the first location in the network of pipes that form a pipeline to the remote second location in the network of pipes that form a pipeline and is used for a desired application.

14. The apparatus of claim 13 wherein said digital electronic or computer-based apparatus used for signal processing includes Green's function analysis.

15. The apparatus of claim 13 wherein said digital electronic or computer-based apparatus used for signal processing includes matched filter techniques.

16. The apparatus of claim 13 wherein said digital electronic or computer-based apparatus used for signal processing includes a time reversal signal processor.

17. The apparatus of claim 13 wherein said transmitters include the capability to send an identification code as part of the signal, and the signal processor includes the capability to identify the source transmitter based on the identification code.

* * * * *